United States Patent [19]

Wettengl

[11] Patent Number: 4,462,903
[45] Date of Patent: Jul. 31, 1984

[54] APPARATUS FOR PURIFYING WASTE WATER

[75] Inventor: Dietmar Wettengl, Cologne, Fed. Rep. of Germany

[73] Assignee: Buckau-Walther Aktiengesellschaft, Grevenbroich, Fed. Rep. of Germany

[21] Appl. No.: 549,186

[22] Filed: Nov. 4, 1983

[30] Foreign Application Priority Data

Dec. 4, 1982 [DE] Fed. Rep. of Germany ....... 3244963

[51] Int. Cl.³ ............................................. C02F 1/72
[52] U.S. Cl. ................................. 210/150; 210/763;
  210/201; 210/220; 210/252; 210/253; 422/141;
  422/142; 422/143
[58] Field of Search ............... 210/617, 618, 629, 631,
  210/721, 722, 763, 150, 151, 194, 195.3, 197,
  200, 201, 220, 252, 253; 422/141, 142, 143, 145

[56] References Cited

U.S. PATENT DOCUMENTS

| 3,442,802 | 5/1969 | Hamilton | 210/763 |
| 3,754,993 | 8/1973 | Oguchi | 422/141 |
| 3,878,097 | 4/1975 | Mochizuki | 210/220 |
| 3,954,606 | 5/1976 | Block | 210/629 |
| 4,035,152 | 7/1977 | Yang | 422/143 |
| 4,139,456 | 2/1979 | Yabuuchi | 210/722 |

FOREIGN PATENT DOCUMENTS

| 3126078 | 1/1983 | Fed. Rep. of Germany | 210/763 |
| 57-20038 | 4/1982 | Japan | 210/763 |

Primary Examiner—Ernest G. Therkorn
Attorney, Agent, or Firm—Peter K. Kontler

[57] ABSTRACT

The present invention relates to a device for the catalytic oxidation purification of waste water inside a reaction vessel. The vessel includes a front wall, a back wall, two side walls interconnecting the front and back wall and a bottom. The waste water is admitted into the vessel through admitting means located on the front wall and discharged through discharge means located on the back wall. The vessel is divided into a plurality of compartments each of which includes a pair of risers which are divided by a plurality of partitions to form a plurality of sub-chambers. The partitions include an oscillatable flap or, alternatively, are tilted in a direction opposite to the direction of flow of the water in the vessel. In this manner, entrapment of the catalyst particles is prevented.

17 Claims, 3 Drawing Figures

APPARATUS FOR PURIFYING WASTE WATER

BACKGROUND OF THE INVENTION

The present invention relates generally to apparatus for purifying waste water and, more particularly, to such apparatus wherein the waste water is oxidized by the introduction of oxygen or an oxygen-containing gas in the presence of solid catalytic particles. The reaction, which may take place at ambient temperature and normal pressure, is preferably accomplished in a rectangular or square-shaped reaction basin or vessel which is open at the top. The reaction vessel includes a front wall and opposite back wall and two side walls. Inlet feed means are provided on the front wall for introducing waste water into the vessel. The vessel further includes outlet discharge means on the opposite back wall for discharging purified water from the vessel and a plurality of dividing walls which subdivide the vessel into a plurality of compartments or chambers. Each of the chambers include a pair of upwardly projecting risers interconnected by a plurality of angled or cocked partitions which form subchambers. The risers are positioned at a predetermined distance above the bottom of the reaction basin or vessel and terminate below the suface of the fluid which is to be contained in the vessel. A ventilating device may be provided below the risers in accordance with the teachings of, for example, West German Pat. No. P 31 26 078.0.

In accordance with the teachings of the present invention, the oxygen or oxygen-containing gas is adapted to contact the waste water from the bottom of the vessel and thereupon rise up through the water. The gas is uniformly directed in a predetermined pattern upwardly from the bottom of the vessel through the water. Equalization of the contact mass takes place automatically from chamber to chamber within the vessel with part of the contact mass being deposited at the bottom of the vessel. Due to the inflow of waste water, a vertical fluid flow is achieved in the region of the risers while a horizontal flow is achieved in the region of the bottom of the vessel.

OBJECTS AND SUMMARY OF THE INVENTION

An object of the present invention is to provide apparatus for use in performing catalytic, oxidative waste water purification.

It is another object of the present invention is to provide apparatus for purifying waste water by reaction with a catalyst and oxygen or an oxygen containing gas, wherein the gas is introduced from the bottom of the vessel upwardly to the surface of the waste water.

It is a still further object of the present invention to provide such apparatus wherein the flow of the gas from the bottom of the vessel is uniformly directed.

It is yet another object of the present invention to provide such apparatus wherein the catalyst particles are carried by the waste water in the direction of flow of the waste water, i.e., from the inlet side of the vessel to the outlet or discharge side thereof.

It is still yet another object of the present invention to provide such apparatus which requires the introduction of minimal amounts of gas and energy to effect formation of the catalyst-fluidization and cause the waste water to flow through the process.

It is yet another object of the present invention to provide such apparatus wherein destruction of the catalyst particles due to abrasion is minimized and, moreover, where entraining of the catalyst particles is avoided.

The above objects and advantages are accomplished by providing apparatus for purifying waste water by oxidation of the waste water components with oxygen containing gasses or with pure oxygen in the presence of catalyst particles. Oxidation is accomplished under normal pressure and at ambient temperature in a rectangular or square reaction basin or vessel. The vessel, which includes a front and back wall interconnected by a pair of side walls, is open at the top. The bottom of the vessel includes a plurality of funnel-shaped portions the sections of which are angled toward the center of the portion. The vessel includes inlet feed means on the front wall for introducing waste water into the vessel and outlet discharge means on the back wall for discharging or otherwise removing the purified water from the vessel. A plurality of internal subdividing walls are further provided for subdividing the reaction vessel into a plurality of substantially enclosed compartments or chambers. Within each of the substantially enclosed chambers is included a pair of upwardly angled risers and a plurality of partitions which interconnect the risers and form a plurality of sub-chambers. The risers are positioned in a direction generally parallel to the flow of the waste water from the inlet means to the outlet means. The risers and the partitions extend vertically from a point beginning above the bottom of the reaction vessel and terminate at a point below the uppermost fluid level of the vessel when its contains waste water. The partitions interconnecting and separating the risers are angled or otherwise cocked or tilted. Alternatively, the partitions may include adjustable oscillatable flaps at the top thereof. A ventilating device is provided below the risers for introducing the gas from below the the waste water for flowing upwardly therethrough. Separate or individual inlet and outlet means are provided for each of the compartments and ports are provided on the ventilating device for forcing gas up into each of sub-chambers.

It has been found that by providing substantially enclosed chambers or compartments in a direction substantially parallel to the flow of the waste water from inlet to outlet and, moreover, by providing separate and independent inlet and outlet means for each chamber or compartment, the objects and advantages of the present invention are more effectively accomplished. Further, it has been found that by angling or otherwise cocking the partitions or, alternatively, by providing an adjustable, oscillatable flap at the top thereof, back transportation of the particles of the catalyst is achieved. This permits one to be able to control and regulate the transport speed in the vertical direction. Similarly, the flow of the mass within the individual chambers is regulated. This produces an uneven distribution of the catalyst particles inside the chambers of the vessel and, thus, an optimization of the water purification system.

The novel features which are considered as characteristic of the invention are set forth, in particular, in the appended claims. The improved apparatus itself, however, both as to its construction and its mode of operation, together with additional features and advantages thereof, will be best understood upon review of the following detailed description of certain specific embodiments with reference to the accompanying drawing.

DESCRIPTION OF THE PREFERRED EMBODIMENTS

Figure 1:
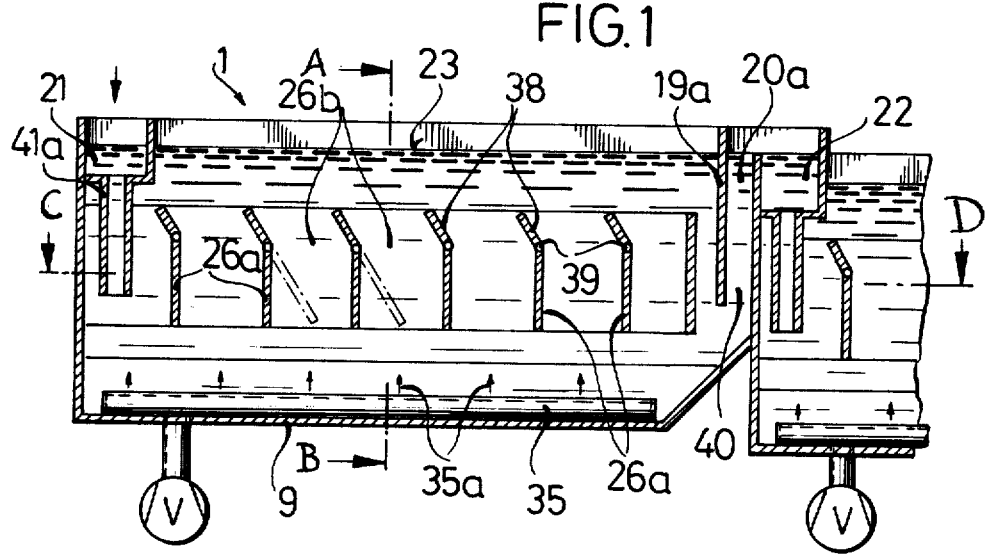
FIG. 1 is a sectional, side elevation view of the water purification apparatus of the present invention.
Figure 2:
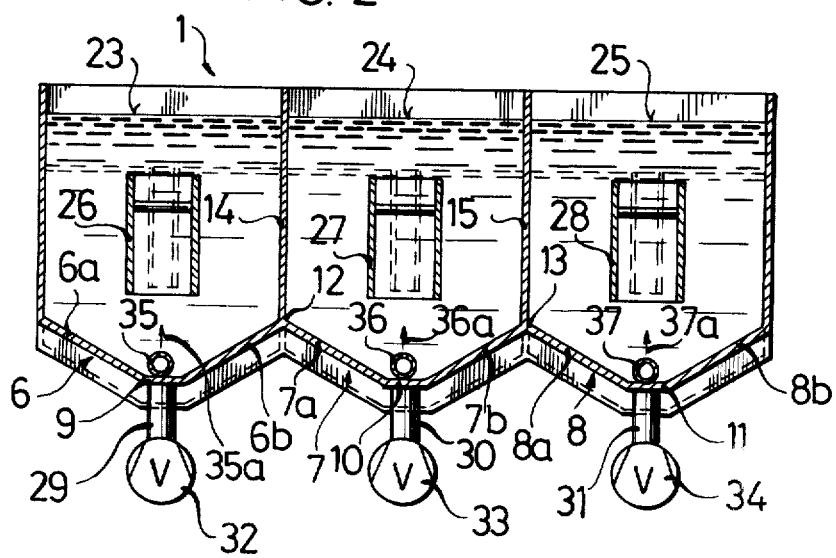
FIG. 2 is a sectional view taken along line A-B of FIG. 1.
Figure 3:
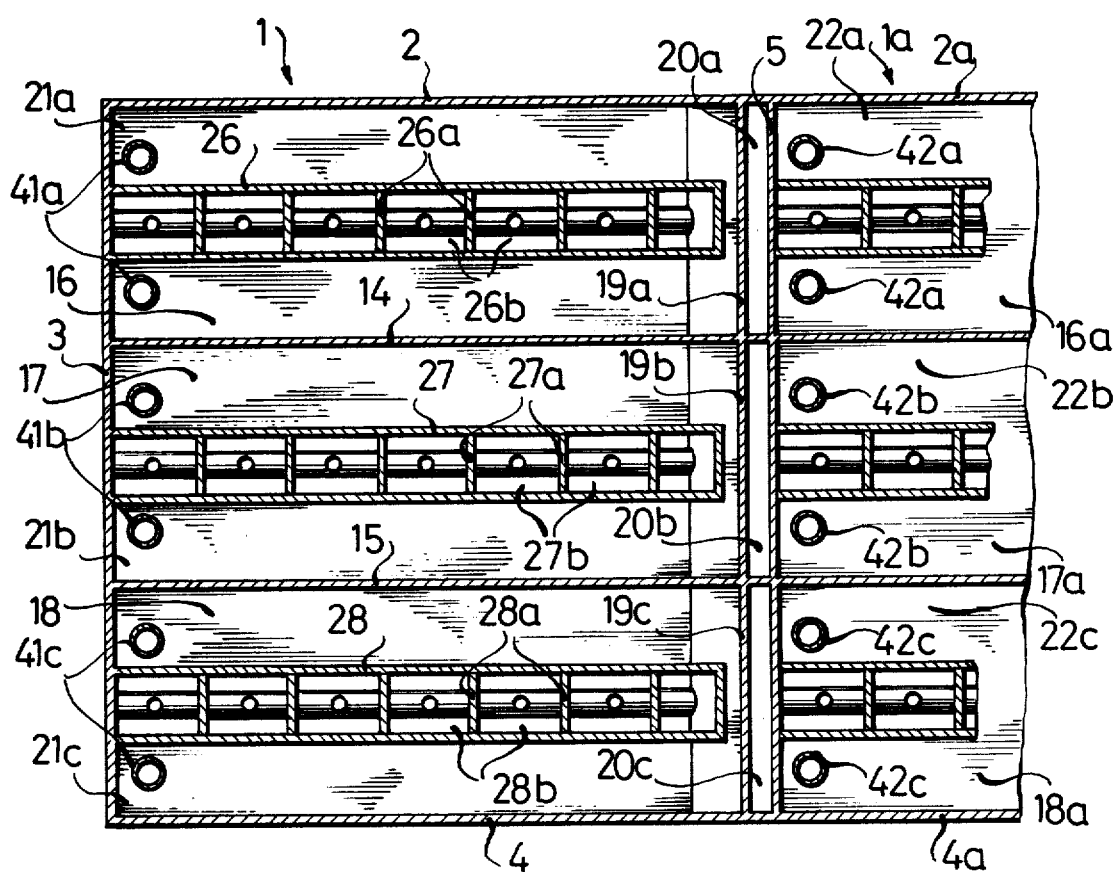
FIG. 3 is a sectional view taken along line C-D of FIG. 2.

The reaction basin or vessel of the present invention, referred to generally by reference numeral 1, is illustrated in side, end and top views in FIGS. 1, 2 and 3, respectively. The reaction vessel 1 contains a front wall 3 and a rear or back wall 5 which are interconnected by two side walls 2 and 4 which define an interior reaction chamber. The top of the reaction vessel is substantially open. The interior of the vessel 1 is divided into a plurality of individual treatment compartments 16, 17 and 18 by at least two parallel dividing walls 14 and 15 which extend between the front wall 3 and the back wall 5 and which are substantially parallel to the side walls 2 and 4. The reaction vessel 1 further includes a bottom having a plurality of substantially funnel-shaped bottom portions 6, 7 and 8 which are positioned respectfully below each of the compartments 16, 17 and 18. Each of the bottom portions 6, 7 and 8 include a pair of downwardly angled bottom sections 6a and 6b; 7a and 7b; and 8a and 8b, respectively, which are interconnected by lowermost sections 9, 10 and 11, respectively, to form the funnel-shape bottom portion 6, 7 and 8 for each compartment. Bottom portions 6 and 7 are interconnected at connecting joint 12 and bottom portions 7 and 8 are interconnected at connecting joint 13. Dividing walls 14 and 15 are provided vertically extending above connecting joints 12 and 13, respectively, and serve to define horizontally extending treatment compartments 16, 17 and 18.

Provided within chambers 16, 17 and 18 are downwardly extending guiding walls 19a, 19b and 19c, respectively. Guiding walls 19a, 19b and 19c are positioned in advance of the back wall 5 of the vessel 1 and extends downwardly from the top of the vessel into the respective compartment 16, 17 or 18. The guiding walls 19a, 19b and 19c and the back wall 5 define exhaust ports 20a, 20b and 20c, respectively, which are accessed through a lower entrance port 40 provided below the guiding walls 19a, 19b and 19c.

Discharge devices 22a, 22b and 22c for discharge of pure water from the compartments 16, 17 and 18, respectively, are provided behind the back wall 5 and correspond with the compartments 16, 17 and 18, respectively. As shown best in FIG. 1, the water which is treated in the respective compartment 16, 17 or 18 exits that compartment and is introduced into the respective exhaust port 20a, 20b or 20c passing through lower entrance port 40 below the respective guiding wall 19a, 19b or 19c. Due to the difference in height between the guiding wall 19a, 19b and 19c and the back wall 5 (the back wall 5 is lower in height than the guiding walls 19a, 19b and 19c), the purified water then flows over the back wall 5 and is introduced into the respective discharge device 22a, 22b or 22c depending upon the respective compartment 16, 17 or 18 from which the water travels.

Inlet means in the form of admitting devices 21a, 21b and 21c are provided on the front wall 3 for the introduction of waster water into the respective compartment 16, 17 and 18. The admitting devices 21a-c each include an admitting opening which is interconnected to the vessel 1 through feed lines 41a-c, respectively. Separate admitting devices 21a, 21b and 21c are provided for each of the compartments 16, 17 and 18. The admitting devices 21a-c and the discharge devices 22a-c are so provided at opposite ends of the compartments 16-18 so as to maintain a uniformly high waste water level (designated by reference numerals 23, 24 and 25 for compartments 16, 17 and 18 respectively as shown in FIG. 2).

Each of the compartments 16, 17 and 18 includes a pair of longitudinally extending risers 26, 27 and 28, respectively. The risers 26-28 each extend vertically commencing at a point above the lowermost sections 9, 10 and 11 of each compartment 16, 17 and 18, respectively, and terminate at a point below the high waste water level 23, 24 and 25 of each chamber. The pair of horizontally extending risers 26, 27 and 28 for each chamber are each interconnected by a plurality of dividing walls or partitions 26a, 27a and 28a, respectively, which form or otherwise define a plurality of subchambers 26b, 27b and 28b, respectively. The admitting pipes 41 of the inlet means are adapted to extend to the middle of the vertical height of the risers 26, 27, 28.

In order to prevent the accumulation of catalytic particles inside of the compartment, 16, 17 and 18, the partitions 26a-28a each include at their upper ends, pivotable and oscillatable flaps 38 which are pivotably secured to the respective partition 26a-28a by at least one hinge joint 39. The provision of such a flap at the upper portion of the partition serves to achieve a backflow of the catalyst-water mixture. Simultaneously, accumulation of the catalyst at controllable points is prevented. An alternative to the use of pivotably mounted oscillatable flaps 38 is the tilting or canting of the partitions 26a-28a in a direction opposite to the direction of water flow. Such an alternative is illustrated in FIG. 1 by broken lines.

At least one ventilating pipe 35, 36 and 37 is provided in each compartment 16, 17 and 18, respectively, positioned below the risers 26, 27 and 28 and on the lowermost section 9, 10 and 11 of the respective chamber. The ventilating pipes 35, 36 and 37 each include a plurality of nozzle shaped openings 35a, 36a and 37a which are positioned such that one of each opening is positioned immediately below each subchamber 26b, 27b and 28b. Oxygen or oxygen containing gasses are adapted to be introduced into the subchambers through the openings 35a, 36a and 37a from ventilators 32, 33 and 34, respectively, which may include, for example, blast fans or the like. Feed lines 29, 30 and 31 are provided for directing the gasses from the respective ventilator 32, 33 and 34 to the respective ventilating pipe 35, 36 and 37.

Waste water is introduced into and evenly distributed among the compartments 16, 17 and 18 through the respective admitting devices 21a, 21b and 21c. Catalytic particles for use in aiding the oxidation/purification reaction of the waste water may be introduced into the compartments in equal amounts divided between compartments 16, 17 and 18 either through the admitting devices 21a, 21b or 21c with the waste water or directly from the top of the vessel 1. Similarly, oxygen or oxygen containing gasses are introduced into the vessel 1 and its respective compartments 16, 17, 18 from the ventilators 32, 33 and 34 through the ventilating pipes 35, 36 and 37. By introducing the gas from below, the waste water in the compartments 16, 17 and 18 is repeatedly caused to be forced in an upward direction within subchambers 26b, 27b and 28b, over the risers 26, 27 and 28 where it falls again only to be again forced upward by the action of the gas. This is repeated over and over again resulting in complete reaction of the waste water with the oxygen containing gas and the catalyst particles. In this manner, the waste water has a chance to completely react with the catalytic particles and becomes purified.

This process is repeated over and over again with the eventually purified water then flowing into exhaust ports 20a, 20b and 20c through the respective entrance ports 40. From the exhaust ports 20a-c, the purified water then flows over the back wall 5 where it is introduced into corresponding discharge devices 22a, 22b and 22c which simultaneously serve as admitting devices for downstream reaction vessel 1a. Downstream reaction vessel 1a is positioned on a lower elevational plane than main reaction vessel 1 to permit gravitational flow of the purified water from one vessel to the next. Feeding lines 42a, 42b and 42c are provided for the corresponding discharge devices 22a, 22b and 22c, respectively.

Without further analysis, the foregoing will so fully reveal the gist of the present invention that others can, by applying current knowledge, readily adapt it for various applications without omitting features that, from the standpoint of prior art, fairly constitute essential characteristics of the generic and specific contributions to the art and, therefore such adaptations should and are intended to be comprehended within the meaning and range of equivalence of the claims.

I claim:

1. Apparatus for purifying waste water by oxidizing the water with oxygen or oxygen containing gas in the presence of particles of a solid catalyst in a reaction vessel having a plurality of sides and a bottom which defines an internal cavity which includes a plurality of compartments, said reaction vessel including inlet means for introducing waste water into said compartments in sufficient amounts to reach a high water level, outlet means for discharging purified water from the compartments after purification and ventilating means for introducing said gas into said compartments from the bottom of the vessel, wherein each of the chambers includes a pair of risers interconnected by a plurality of partitions to form a plurality of sub-chambers, said risers and said partitions being proximately spaced from the bottom of the vessel and above said ventilating means and extending to a point below the high water level of the vessel and wherein said inlet means include separate inlet devices for each of said compartments and said outlet means include separate outlet devices for each of said compartments.

2. The apparatus of claim 1 wherein said apparatus is adapted to purify said waste water under normal pressure and at ambient temperature.

3. The apparatus of claim 1 wherein said vessel is rectangular.

4. The apparatus of claim 1 wherein said vessel is square in shape.

5. The apparatus of claim 1 wherein said vessel is open at the top.

6. The apparatus of claim 1 wherein the bottom of said vessel includes at least two inclined sections extending downwardly in the direction of the center of the vessel.

7. The apparatus of claim 6 wherein each of said compartments includes at least two inclined sections extending downwardly in the direction of the center of the compartment.

8. The apparatus of claim 1 wherein said vessel includes opposed front and back walls and wherein the inlet means are provided on the front wall and in the outlet means are provided on the back wall.

9. The apparatus of claim 8 wherein said vessel is divided into said compartments by a plurality of dividing walls which extend from the front wall to the back wall and which, in combination with a pair of opposed side walls interconnecting said front and back wall, define said plurality of compartments within said vessel.

10. The apparatus of claim 9 wherein said dividing walls and risers extend in a direction parallel to the direction of flow of the waste water from the front wall to the back wall.

11. The apparatus of claim 1 wherein the partitions are angled in a direction opposite the direction of flow of the water in said vessel.

12. The apparatus of claim 1 wherein each of said partitions include at their upper ends at least one oscillatable flap pivotably attached to said partitions.

13. The apparatus of claim 12 wherein said oscillatable flaps are inclined in a direction opposite the direction of flow of the water in said vessel.

14. The apparatus of claim 1 further comprising a second reaction vessel positioned downstream of said reaction vessel.

15. The apparatus of claim 14 wherein the outlet means for said reaction vessel comprises the inlet means for said second reaction vessel.

16. The apparatus of claim 15 wherein said said second reaction vessel is positioned on a lower plane than said reaction vessel so that the water passing from said vessel to said second reaction vessel is assisted by gravity.

17. The apparatus of claim 1 wherein said inlet means include at least one admitting device having an admitting opening interconnected to said vessel by at least one feed line which is adapted to extend to the mid-height of the risers.

* * * * *